United States Patent [19]

Fujiwara

[11] Patent Number: 4,949,195

[45] Date of Patent: Aug. 14, 1990

[54] VIDEO SIGNAL MAGNETIC RECORDING AND/OR REPRODUCING APPARATUS WITH AUTOMATIC MODE DISCRIMINATION

[75] Inventor: Naohisa Fujiwara, Nagaokakyo, Japan

[73] Assignee: Mitsubishi Denki Kabushiki Kaisha, Tokyo, Japan

[21] Appl. No.: 233,654

[22] PCT Filed: Oct. 27, 1987

[86] PCT No.: PCT/JP87/00827

§ 371 Date: Jun. 28, 1988

§ 102(e) Date: Jun. 28, 1988

[87] PCT Pub. No.: WO88/03348

PCT Pub. Date: May 5, 1988

[30] Foreign Application Priority Data

Oct. 28, 1986 [JP] Japan ................................. 61-257362

[51] Int. Cl.⁵ ............................................. H04N 5/78
[52] U.S. Cl. ................................... 360/33.1; 360/69
[58] Field of Search ............... 358/18, 139, 153, 310, 358/314, 335, 336; 360/31, 33.1, 38.1, 69

[56] References Cited

U.S. PATENT DOCUMENTS

| | | | |
|---|---|---|---|
| 4,240,102 | 12/1980 | Groeneweg | 358/18 |
| 4,574,301 | 3/1986 | Sachs | 358/18 |
| 4,604,659 | 8/1986 | Itoh et al. | 360/38.1 |
| 4,722,004 | 1/1988 | Miyamoto et al. | 358/139 |
| 4,811,122 | 3/1989 | Kido et al. | 360/31 |

*Primary Examiner*—Donald McElheny, Jr.

[57] ABSTRACT

The invention relates to a mode discrimination circuit for use in a magnetic recording and/or reproducing apparatus. A reproduced luminance signal FM wave is applied to a bandpass filter which passes the frequencies which are in the vicinity of a tip of a synchronizing signal of the standard mode. The output of the bandpass filter is applied to an envelope wave detection circuit which provides a detected output. The detected output is applied to a hold circuit which holds the detected output for a predetermined period of time to thereby output a signal indicative of a standard or high band recording mode of the reproduced luminance signal FM wave.

8 Claims, 2 Drawing Sheets

7: BPF Output

9: Wave Detected Output

11: High Band Discriminating Signal

7: BPF Output
9: Wave Detected Output
11: High Band Discriminating Signal

1: Luminance Signal FM Wave
2: Low Frequency Range Conversion Chroma Signal

1a: Luminance Signal FM Wave

VIDEO SIGNAL MAGNETIC RECORDING AND/OR REPRODUCING APPARATUS WITH AUTOMATIC MODE DISCRIMINATION

FIELD OF TECHNOLOGY

The present invention relates to the discrimination of an FM carrier frequency in a video signal magnetic recording and/or reproducing apparatus (hereinafter referred to as VCR).

BACKGROUND ART

FIG. 3 illustrates a frequency allocation for the standard mode described in a handling manual of, for example, the VCR of Sony make, HF-900 (hereinafter referred to as the conventional apparatus), wherein 1 represents a luminance signal FM wave, 2 represents a low frequency range conversion chroma signal, 3 represents an FM carrier frequency (3.6 MHz) of a sync signal tip, and 4 represents an FM carrier wave (4.8 MHz) of a white peak. FIG. 4 illustrates a frequency allocation of a high band mode, wherein 1a represents a luminance signal FM wave of the high band mode, 3a represents an FM carrier frequency (4.4 MHz) of a sync signal tip, and 4a represents an FM carrier frequency (5.6 MHz) of a white peak.

In the above described conventional apparatus, according to the standard mode, at the luminance signal FM wave 1, the FM carrier frequency 3 of the sync signal tip is 3.6 MHz, and the FM carrier frequency 4 of the white peak is 4.8 MHz. On the other hand, according to the high band mode, the FM carrier frequency 3a of the sync signal tip is 4.4 MHz and the FM carrier frequency 4a of the white peak is 5.6 MHz.

Although in the VCR the frequency characteristics of the FM wave must be modified where the carrier frequency of the luminance signal FM wave is to be changed, the conventional apparatus is so designed that the frequency characteristics of the reproduced FM wave are modified by verifying a reproduced image on a monitor TV with sight and then by manually operating a change-over switch. Accordingly, it may happen that at the high band mode the change-over switch may be connected to the standard mode position, and in that case, there has been a problem in that the reproduced image tends to be disturbed.

SUMMARY OF THE INVENTION

The present invention has been developed with a view to eliminating the above discussed problem and has for its object to provide a video signal magnetic recording and/or reproducing apparatus which is able to automatically discriminate the high band mode and to then automatically switch the mode over during reproduction.

The VCR to which the present invention pertains is one which is provided with a bandpass filter capable of allowing to pass therethrough only a frequency in the vicinity of a tip of a synchronizing signal of the luminance signal FM wave modulated by a carrier of predetermined frequency, a wave detecting circuit for carrying out an envelope wave detection of an output from the filter, and a discriminating circuit for discriminating the high band mode in reference to an output from the wave detecting circuit.

In the present invention, the discrimination is carried out by the bandpass filter through which only the frequencies in the neighborhood of the sync signal tip portion of the luminance signal FM wave can pass, and the high band mode can be discriminated by the envelope wave detection of a signal which has passed.

According to the present invention, since the discrimination of the high band mode is carried out by means of the bandpass filter through which only the frequencies in the neighborhood of the tip of the synchronizing signal of the luminance signal FM wave can pass, and then by effecting the envelope detection of the signal which has passed therethrough, there are such effects that a highly precise mode discrimination can be accomplished with the simple and inexpensive apparatus and by the utilization of the result of such mode discrimination the mode change-over can be carried out automatically.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Figure 1:
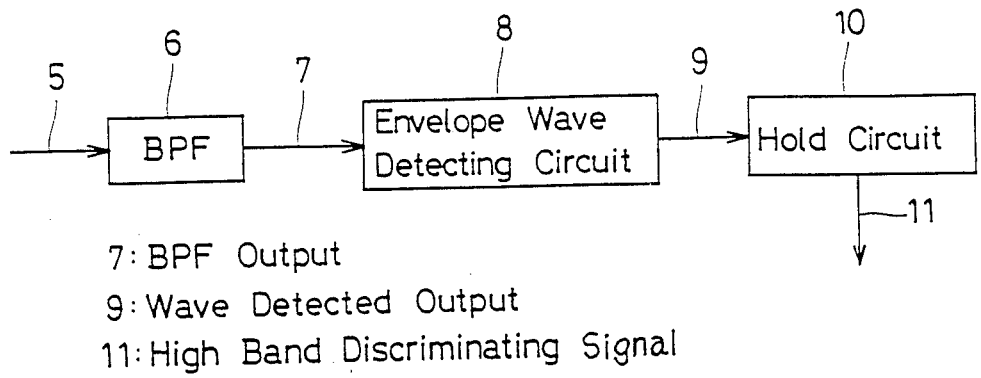
FIG. 1 is a block circuit diagram illustrating a construction of the mode discrimination of the VCR according to one embodiment of the present invention.
Figure 2:
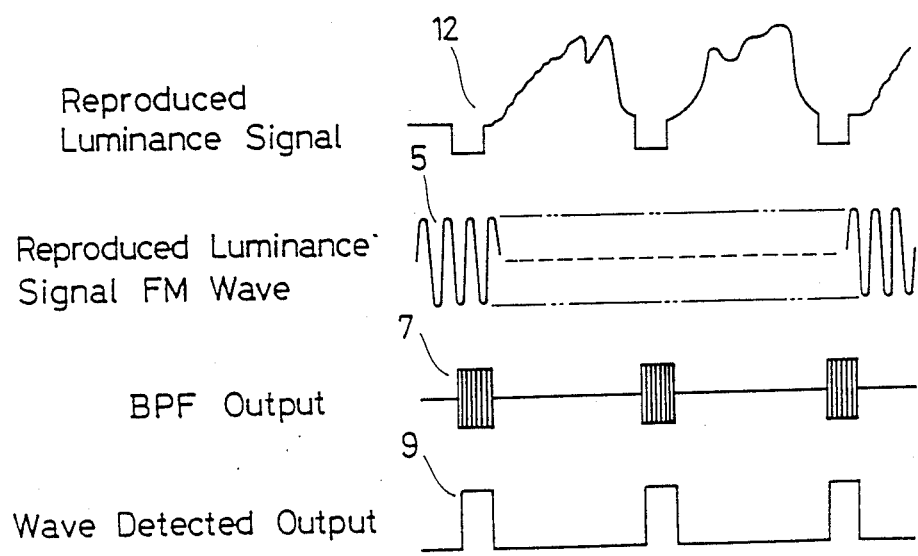
FIG. 2 is a diagram illustrating waveforms of signals of the embodiment of the present invention.

Hereinafter, one embodiment of the present invention will be described with reference to the drawings. In FIG. 1, reference numeral 5 represents a reproduced luminance signal FM wave, and reference numeral 6 represents a bandpass filter (BPF), the bandpass range of which is so selected as to permit only a frequency in the vicinity of the sync signal tip portion of the reproduced luminance signal FM wave to pass therethrough. Reference numeral 7 represents a BPF output, reference numeral 8 represents an envelope wave detecting circuit, reference numeral 9 represents a wave detected output, reference numeral 10 represents a hold circuit, and reference numeral 11 represents a high band discriminating signal. FIG. 2 illustrates respective waveforms of various signals of the above mentioned circuit and, in this drawing, 12 represents a reproduced luminance signal.

Figure 3:
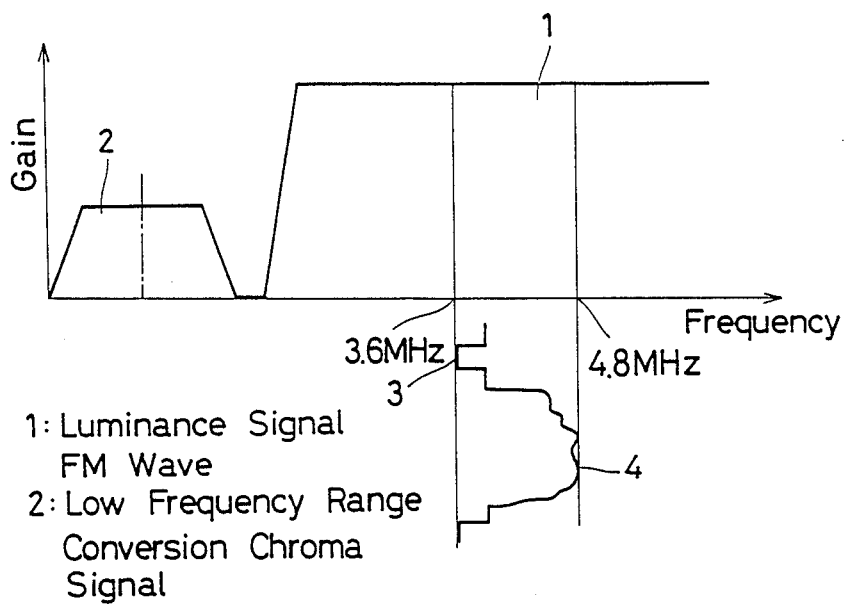
FIG. 3 is a diagram illustrating the frequency allocation for the standard mode in the VCR.
Figure 4:
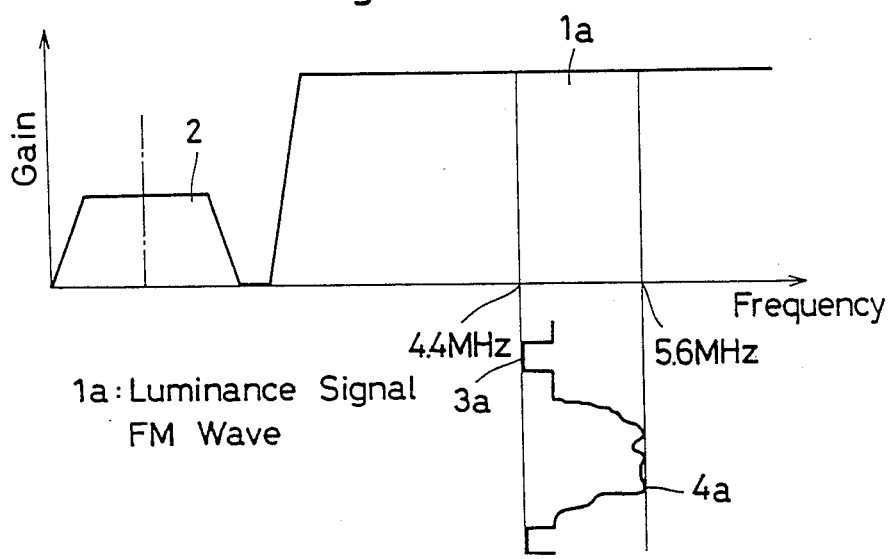
FIG. 4 is a diagram illustrating the frequency allocation for the high band mode.

The BPF output 7 of the sync signal tip portion of the reproduced luminance signal FM wave 5 can be obtained during the standard mode through the use of BPF 6, through which only the frequency in the vicinity of the sync signal tip portion of the luminance signal FM wave for standard mode passes. On the other hand, since during the high band mode no frequency component passes through the BPF 6, no signal would appear in the BPF output 7 (See FIGS. 3 and 4). In the event that a BPF output 7 is provided (during the standard mode), the wave detection is carried out by the envelope detecting circuit 8 to obtain the wave detected output 9. This signal is held in the hold circuit 10 for one horizontal period whereby the hold circuit 10 provides the high band discriminating signal 11 as output. This high band discriminating signal 11 is of a high level during the standard mode, and of a low level during the high band mode.

Accordingly, in such an embodiment, with the simple and inexpensive apparatus such as the BPF and the wave detecting circuit, precise high band mode discrimination can be carried out, and by the utilization of the result of this discrimination, the mode changeover can be automatically carried out.

It is to be noted that although the foregoing embodiment has been considered wherein the discrimination is carried out in each horizontal synchronizing signal portion, the discrimination may instead be done only during a period of a vertical synchronizing signal.

It is further noted that the present invention can be applicable not only to VCR, but also to any magnetic recording and/or reproducing apparatus wherein the high band mode is automatically discriminated in reference to a level of the FM wave at a frequency in the vicinity of a tip portion of the synchronizing signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. In a video signal magnetic recording/reproducing apparatus, a mode discriminating circuit which automatically discriminates the original recording of a reproduced luminance signal FM wave in a standard mode or high band mode comprising:
   a bandpass filter, coupled to said reproduced luminance signal FM wave and of a selected bandpass, passing as a bandpass filter output frequencies in the vicinity of a sync signal tip portion of the reproduced luminance signal FM wave for said standard mode;
   an envelope wave detecting circuit, coupled to said bandpass filter, providing a wave detected output in accordance with said bandpass filter output; and
   a hold circuit, coupled to said envelope wave detecting circuit, holding said wave detected output for a predetermined period of time to provide a discrimination signal of a high level indicative of said standard mode and of a low level indicative of said high band mode.

2. The mode discrimination circuit of the video signal magnetic recording/reproducing apparatus of claim 1 wherein discrimination is carried out in each of a horizontal synchronizing signal portion.

3. The mode discrimination circuit of the video signal magnetic recording/reproducing apparatus of claim 1 wherein discrimination is carried out in each of a vertical synchronizing signal portion.

4. In a video signal magnetic recording/reproducing apparatus, a mode discriminating circuit which automatically discriminates the original recording of a reproduced luminance signal FM wave in a standard mode or high band mode comprising:
   a bandpass filter, coupled to said reproduced luminance signal FM wave and of a selected bandpass, passing as a bandpass filter output frequencies in the vicinity of a sync signal tip portion of the reproduced luminance signal FM wave of one of said modes;
   an envelope wave detecting circuit, coupled to said bandpass filter, providing a wave detected output in accordance with said bandpass filter output; and
   a hold circuit, coupled to said envelope wave detecting circuit, holding said wave detected output for a predetermined period of time to provide a discrimination signal of a high level indicative of said one of said modes and of a low level indicative of the other of said modes.

5. A method of discriminating an original recording of a reproduced luminance signal FM wave in a standard mode or a high band mode in a magnetic recording/reproducing apparatus comprising:
   passing, as a bandpass filter output, frequencies of said reproduced luminance signal FM wave in the vicinity of the sync signal tip portion of said standard mode;
   envelope wave detecting said bandpass filter output to provide an envelope detected output; and
   holding said envelope detected output for a predetermined period of time in order to generate a discrimination signal of high level indicative of said standard mode and of a low level indicative of said high band mode.

6. The method of discriminating of claim 5 wherein discrimination is carried out in each of a horizontal synchronizing signal portion.

7. The method of discriminating of claim 5 wherein discrimination is carried out in each of a vertical synchronizing signal portion.

8. A method of discriminating an original recording of a reproduced luminance signal FM wave in a standard mode or a high band mode in a magnetic recording/reproducing apparatus comprising:
   passing, as a bandpass filter output, frequencies of said reproduced luminance signal FM wave in the vicinity of the sync signal tip portion of one of said modes;
   envelope wave detecting said bandpass filter output to provide a envelope detected output; and
   holding said envelope detected output for a predetermined period of time in order to generate a discrimination signal of high level indicative of said one of said modes and of a low level indicative of the other of said modes.

* * * * *